United States Patent [19]

Vignal

[11] Patent Number: 4,780,868
[45] Date of Patent: Oct. 25, 1988

[54] CARTRIDGE FOR AN OPTICAL DISK FOR RECORDING DATA ON THE TWO FACES THEREOF AND THE ASSOCIATED READING DEVICE

[75] Inventor: Carlo Vignal, Romano, Italy

[73] Assignee: Ing. C. Olivetti & C., S.p.A., Ivrea, Italy

[21] Appl. No.: 56,701

[22] Filed: Jun. 2, 1987

[30] Foreign Application Priority Data

Jun. 20, 1986 [IT] Italy .................. 67501 A/86

[51] Int. Cl.⁴ .............................. B65D 85/57
[52] U.S. Cl. ........................ 369/291; 206/309; 360/133
[58] Field of Search ............. 206/307, 309, 312, 313, 206/444; 360/133; 369/291

[56] References Cited

U.S. PATENT DOCUMENTS

| | | | |
|---|---|---|---|
| 4,589,105 | 5/1986 | Nemoto et al. | 369/291 |
| 4,644,435 | 2/1987 | Nemoto et al. | 360/133 |
| 4,648,001 | 3/1987 | Komatsu et al. | 360/133 |
| 4,660,118 | 4/1987 | Faber | 360/133 |
| 4,682,260 | 7/1987 | Oishi et al. | 206/444 |
| 4,682,322 | 7/1987 | Ohta | 369/291 |

Primary Examiner—Jimmy G. Foster
Attorney, Agent, or Firm—Banner, Birch, McKie & Beckett

[57] ABSTRACT

The cartridge comprises a shutter for closing the openings (18) for access to the disk on the two faces thereof. The shutter is formed by a hollow bar (24) carrying two closure plates (21) and slidable in both directions along a guide (26) adjacent to an edge 19 of the cartridge. A tension spring (28) which passes through the hollow bar 24 is connected to two blocks 30 which are slidable in the guide (26) and which are arranged to be entrained by the bar (24). The trailing block cannot follow the bar because a tongue (31) on the block abuts the end of an elongated lug (32) extending along the central part of the guide (26).

The reading device comprises a case for receiving the cartridge and a lever which is rotated when the cartridge is inserted and carries an element for pushing the shutter aside. The lever 53 is controlled by a cam slot carried by a slide member which is manually actuable to provide for expulsion of the cartridge.

9 Claims, 2 Drawing Sheets

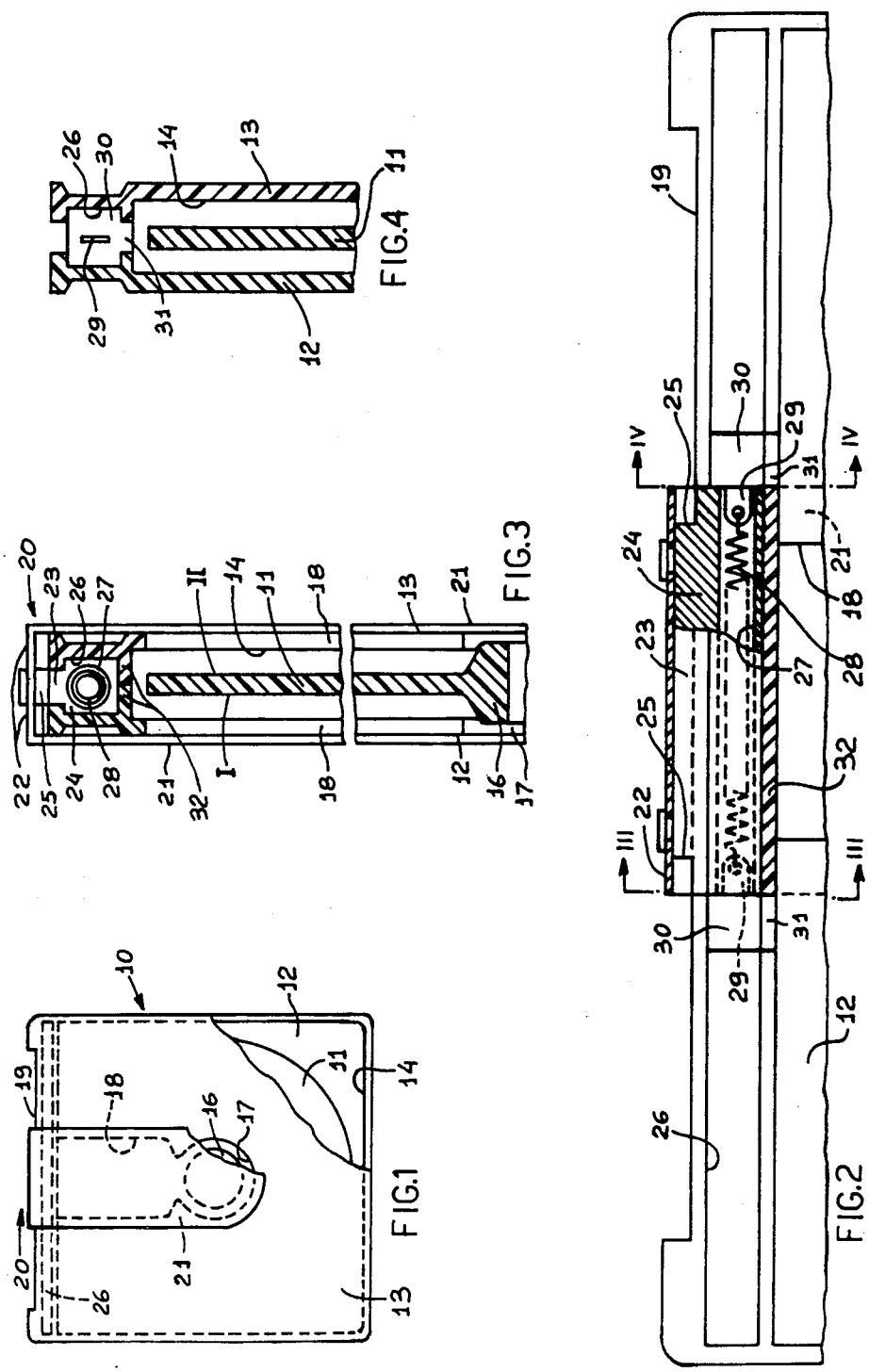

CARTRIDGE FOR AN OPTICAL DISK FOR RECORDING DATA ON THE TWO FACES THEREOF AND THE ASSOCIATED READING DEVICE

BACKGROUND OF THE INVENTION

The present invention relates to an optical disk for recording data on the two faces thereof, and the associated reading device. In particular the invention relates to a cartridge having on each face thereof a substantially radial opening for access to the disk and a shutter for normally closing the two openings, the shutter being held resiliently in its closure position and being slidable from the position in opposite directions to uncover the openings.

As is known, devices for reading optical disks which are recorded on the two faces thereof are arranged to read one face at a time with a single read head, so that the disk has to be inserted on each occasion with the desired face facing towards the head. There is a single shutter for the two faces so that it has to be actuated in different ways for the two faces.

Cartridges are known in which the shutter is displayed from the closure position in a single direction with respect to the cartridge, independently of the face which is to be read. Thus, with respect to the reader, the shutter has to be displaced in two opposite directions so that that arrangement requires two different members for controlling opening of the shutter.

A cartridge has also been proposed in which the shutter is slidable from the closure position in opposite directions and is held in the closure position by a pair of torsion springs so that the cartridge is complicated in construction and the shutter is liable to tilt. In turn, the associated reading device causes opening of the shutter by means of a cam configuration under the action of a motor, so that that system is complicated and expensive to build.

SUMMARY OF THE INVENTION

The object of the present invention is to provide a cartridge for an optical disk having two faces, which is a simple construction and which can be used in a reading device provided with a single member for opening the shutter. Particularly, according to the invention, it is now provided a cartridge for an optical disk for recording data on the two faces thereof, having on each a substantially radial opening for access the disk, and a shutter for normally closing the two openings, the shutter being resiliently held in a closure position and being slidable from this position in opposite directions to uncover the openings, and comprising a hollow bar through which passes a tension spring anchored to two blocks each of which is entrained by the bar in a respective one of the said opposite directions.

BRIEF DESCRIPTION OF THE DRAWINGS

The following description illustrates a preferred embodiment of the invention, given by way of example, in conjunction the accompanying drawings, in which:

FIG. 1 is a diagrammatic view of a cartridge according to the invention,

FIG. 2 is a view in section of a detail from FIG. 1 on an enlarged scale,

FIG. 3 is a view in section taken along line III—III in FIG. 2,

FIG. 4 is a view in section taken along line IV—IV in FIG. 2,

DETAILED DESCRIPTION OF THE PREFERRED EMBODIMENT

Figure 5:
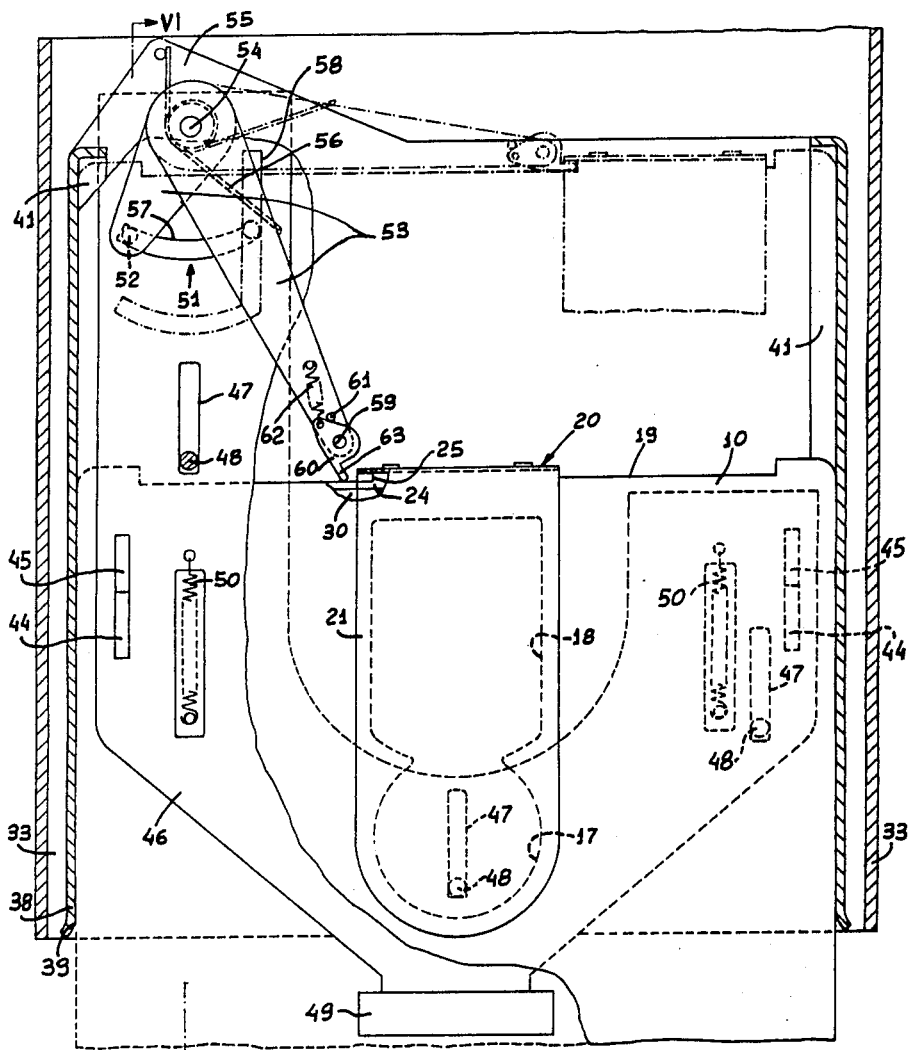
FIG. 5 is a partly sectional plan view of a reading device according to the invention.

Referring to FIG. 1, reference numeral 10 generally indicates a cartridge for an optical disk 11 for recording data. The cartridge 10 is essentially formed by two symmetrical casing portions 12 and 13 (see FIGS. 3 and 4) of substantially square shape, which are conencted together so as to define a space 14 for containing the disk 11. The disk 11 is provided with a hub 16 (see FIG. 1) for driving the disk, the hub normally being disposed in a position of association with a hole 17 in each casing portion 12 and 13.

Data can be recorded on the disk 11 on the two faces thereof, as indicated by I and II in FIG. 3, each adjacent to the respective casing portion 12 and 13. To permit the recording head and the read head to have access to the disk 11, each casing portion 12 and 13 is provided with a radial opening 18 (see FIG. 1) between the hole 17 and an edge 19 of each casing portion 12 and 13.

The cartridge 10 comprises a shutter which is generally indicated by reference numeral 20 and which is formed by two symmetrical metal plates 21 (see FIG. 3) of a sheet 22 which is bent in a U-configuration and which is fixed on a flange 23 of a substantially prism-like bar 24. At its two ends the bar 24 has a shoulder 25 (FIGS. 2 and 3) on which a member for controlling the shutter 20 can act, as will be seen in greater detail hereinafter.

The bar 24 is slidable in a guide formed by a channel 26 disposed adjacent the edge 19 of each casing portion 12 and 13. The two plates 21 are of such a shape as to cover and close the hole 17 and the opening 18 of the two casing portions 12 and 13 when the bar 24 is in the central position as shown in FIGS. 1 and 2, and to open or expose the hole 17 and the opening 18 when the bar 24 is moved from the central position towards one end of the channel 26 or the other.

The bar 24 is provided with an axial hole 27 (see FIG. 2) through which passes a tension spring 28 which is connected between two eyes 29 carried by two prism-like blocks 30 which are slidable along the same channel 26. Each block 30 is provided with a projection 31 which is arranged to bear against the end of a lug 32 (see FIGS. 2 and 3) disposed in the central part of the channel 26 of each casing portion 12 and 13. The length of each lug 32 is equal to the length of the bar 24 so that the two blocks 30 normally hold the bar 24 perfectly centered on the two lugs 32. The shutter unit 20 which is completed by the spring 28 and the blocks 30 is fitted into the channels 26 at the time at which the disc 11 is fitted in the cartridge 10, before the two casing portions 12 and 13 are connected.

When the bar 24 is displaced from the central position in one direction or the other, it entrains a block 30 while the other is arrested against the lugs 32 whereby the spring 28 is stretched. When the bar 24 is released, the spring 28 pulls the displaced block 30 which returns the bar 24 to the central position, closing the shutter 20, so that it will be clear that the shutter 20 can be opened and closed by sliding it along its guide in one direction or the other.

The device for reading the disk 11 comprises a fixed frame structure 33 (see FIGS. 5 and 6) which carries the usual electric motor for driving in rotation a shaft 34 for actuating the disk 11, and a read head 36 which is movable radially in known manner. The shaft 34 has a conical portion to assist with insertion thereof into the hub 16 (see FIG. 3) of the cartridge 10.

Furthermore, mounted on the sides of the frame structure 33 (see FIG. 6) by means of four links 37 is a case 38 which, with the frame structure 33 and the links 37, thus forms a pivoted parallelogram. The case 38 is provided with a front opening 39 (see FIG. 5) for the insertion of the cartridge 10 and two lateral guides 41 on which the cartridge 10 is guided.

The case is provided in its lower part with two rollers 42 (see FIG. 6) by means of which it bears, under the effect of springs 43, against two ribs 44 which each have an inclined portion 45. The ribs 44 are carried by a slide member 45 which is provided with three slots or openings 47 (see FIG. 5), by means of which it is guided by three fixed pins 48. The slide member 47 terminates at its front end with a manually operable button 49 and is normally urged forwardly by a pair of springs 50.

Figure 6:
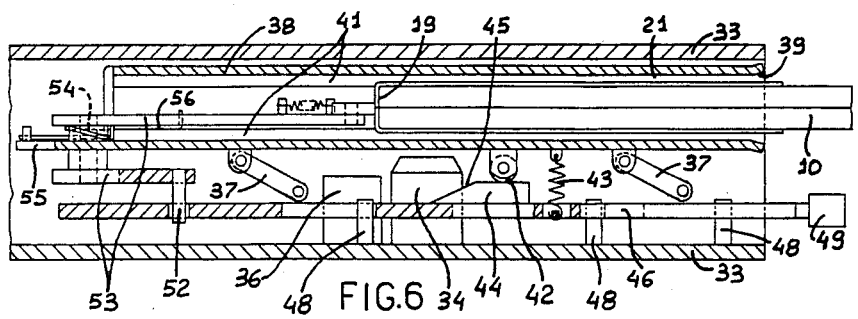
FIG. 6 is a view in section taken along line VI—VI in FIG. 5.

The slide member 46 is also provided with a cam slot or opening 51 into which engages a pin 52 carried by an arm of a lever 53 which is pivoted on a pivot pin 54 carried by a projection 55 on the case 38. The lever 53 is urged in a clockwise direciton by a torsion spring 56. The slot 51 comprises a first portion 57 of circular shape, of a radius equal to the distance of the pin 52 from the pivot 54, and a second straight portion 58 which is parallel to the slots 47. In the rest condition, the lever 53 is rotated in a clockwise direction and, by means of the pin 52, holds the slider member 46 in the retracted position as indicated in FIG. 5 whereby the springs 50 are stressed.

Pivotally mounted on a pivot pin 59 which is carried by the end of the other arm of the lever 53 is a pawl member 60 which is normally held in a condition of bearing against an abutment 61 carried by the lever 53, by means of a spring 62. The pawl 60 is provided with a finger 63 which is arranged to engage the shoulder 25 of the bar 24 of the shutter 20.

The cartridge 10 is fitted into the case 38 in such a way as to bring the face I or II to be read on the disk 11 into a position of association with the head 36 and the shaft 34. When the edge 19 of the two casing portions 12 and 13 of the cartridge 10 meets the finger 63, the pawl 60 is rotated in an anti-clockwise direction on the pivot pin 59 until the finger 63 is disposed parallel to the edge 19.

By continuing to displace the cartridge 10, the edge 19 begins to rotate the lever in the anti-clockwise direction against the force of the spring 56. The finger 63 will then engage the shoulder 25 of the bar 24 which is thus displaced towards the right in FIG. 5 together with the two plates 21 of the shutter 20. The bar 24 then entrains the right-hand block 30 towards the right while the left-hand block remains blocked by the lugs 32 (see FIG. 2) of the casing portions 12 and 13 of the cartridge 10 whereby the spring 28 is tensioned.

In that movement, the pin 52 is displaced along the circular portion 57 of the opening 51 whereby the slide member 46 is not affected.

When the pin 52 reaches a position of association with the straight portion 58 of the opening 51, the springs 50 cause the slide member 46 to jump forwardly whereby the portion 58 blocks the pin 52 and thus the lever 53 in the rotated position, as shown by dash-dotted lines in FIG. 5. The finger 63 thus holds the shutter 20 in the position of being displaced towards the right in which both the opening 18 and the hole 17 are completely uncovered by the shutter 20.

When it moves forwardly, the slide member 46 disengages the ribs 44 (see FIG. 6) from the rollers 42 whereby the springs 43 cause the case 38 to move down under the control of the inclined portions 45. In that movement the case 38 carries the cartridge 10 to be positioned precisely on a pair of reference elements carried by the frame structure 33 but not shown in the drawings. In addition the case 38 carried the hub 16 (FIG. 1) of the disk 11 into engagement with the drive shaft 34 (FIG. 6) whereby the disk 11 can rotate freely in the cartridge 10. The disk 11 thus brings the face which is to be read into a position adjacent to the read head 36.

To remove the cartridge 10 from the case 38, it is only necessary to press on the button 49 in such a way as to cause the slide member 46 to move to the right against the force of the springs 50 (FIG. 5). The portion 58 of the opening 51 then slides on the pin 52 without affecting the lever 53. The inclined surfaces 45 (see FIG. 6) of the ribs 44, acting on the rollers 42, then lift the case 38 against the force of the springs 43, causing disengagement of the hub 16 (FIG. 1) of the disk 11 from the shaft 34 (FIG. 6) and the cartridge 10 from the reference means on the frame structure 33.

When the pin 52 (see FIG. 5) reaches the circular portion 57 of the opening 51, on the one hand the spring 56 causes the lever 53 to rotate in the anti-clockwise direction whereby the pawl 60 expels the cartridge 10. On the other hand the spring 28 (see FIG. 2), by means of the right-hand block 30, causes the shutter 20 to rotate into a central position, thereby closing the opening 18 and the hole 17, so that the cartridge 10 can be withdrawn manually from the reading device.

It will be clear that the movement of the shutter 20 is always from the centre towards the right with respect to the reading device whereby with respect to the cartridge 10 such movement takes place in one direction when the face I is to be read and in the opposite direction when the face II is to be read.

I claim:

1. A cartridge for an optical disk (11) for recording data on the two faces (I, II) thereof, having on each face a substantially radial opening (18) for access to the disk, and a shutter (20) for normally closing the two openings, the shutter being resiliently held in a closure position and being adaptable to slide from this position in opposite directions to uncover the openings, characterized in that the shutter (20) comprises a hollow bar (24) through which passes a tension spring (28) anchored to two blocks (30) to resiliently hold the shutter in said closure position, each one of said blocks being releasably pressed by the bar in a respective one of the said opposite directions, and in that the cartridge further includes preventing means (32) to prevent each of the blocks (3) from moving in the direction of the tension spring.

2. A cartridge according to claim 1 characterised in that the hollow bar (24) is guided in a channel (26) adjacent to an edge of the cartridge, each end (25) of the bar being engageable by a single actuating element for moving the shutter (20) in the corresponding direction with respect to the cartridge.

3. A cartridge according to claim 2, characterized in that the channel (26) is adjacent to the edge of two symmetrical casing portions (12, 13) forming the cartridge, each of the block (30) being guided by the channel, said preventing means including a pair of shoulders (32) on said channel associated with said blocks (30) to prevent the associated block from being pulled by the hollow bar (24) beyond the position of the block in the closure position.

4. A reading device for an optical disk cartridge, wherein said disk (11) is recorded with data on two faces (I, II) thereof, said cartridge having on each face a substantially radial opening (18) for access to the disk and a shutter (20) for normally closing the two openings, the shutter being resiliently held in a closure position and being adaptable to slide from this position in opposite directions to uncover the openings, characterized in that the shutter (20) comprises a hollow bar (24) through which passes a tension spring (28) anchored to the two blocks (30) to resiliently hold the shutter in said closure position, each one of said blocks being releasably pressed by the bar in a respective one of said opposite directions, the cartridge further including preventing means (32) to prevent each of the blocks (30) from moving in the direction of the tension spring, said reading device comprising a case (38) for guiding the cartridge during insertion into the device and an actuating element (63) for moving the shutter, and in that the actuating element (63) is carried by a lever (53) pivoted on the case (38) and capable of being engaged during the insertion operation by the said edge of the cartridge.

5. A device according to claim 4, characterised in that the lever (53) can be held in two different positions by means of a positioning cam (51) carried by a control member (46).

6. A device according to claim 5, characterised in that the control member (46) comprises a slide member having two positions and the positioning cam (51) is formed by an opening co-operating with a cam follower (52) on the lever (53), the cam opening having a first arcuate portion to permit rotary movement of the lever and a second portion for locking the lever in the rotated position.

7. A device according to claim 6, characterised in that the slide member (56) comprises at least one portion (44) with an inclined surface (45), which is capable of displacing the case (38) in such a way as to engage and disengage the disk (11) relative to a rotary drive member (34).

8. A device according to claim 7 characterised in that the slide member (46) is displaced resiliently (50) in one direction to permit the said second portion of the cam opening (51) to lock lever (53) and cause the inclined surface (45) to allow the disk (11) to engage with the drive member (34), the slide member being manually actuable in such a way as to be displaced in the opposite direction to disengage the disk from the drive member and to permit unlocking of the lever and expulsion of the cartridge.

9. A device according to claim 4, characterised in that the actuating element comprises a rotatable pawl (60) on the lever (53), the pawl having a finger (63) capable of being engaged by the said edge to be disposed parallel to the edge, the finger acting transversely on a shoulder (25) at the end of the hollow bar (24).

* * * * *